United States Patent
Richmond

[15] 3,654,814
[45] Apr. 11, 1972

[54] SPROCKET

[72] Inventor: Moscow K. Richmond, 2819 Butler Avenue, Los Angeles, Calif. 90064

[22] Filed: Sept. 8, 1970

[21] Appl. No.: 70,389

[52] U.S. Cl. .................................................. 74/243 R
[51] Int. Cl. .................................................. F16h 55/30
[58] Field of Search .................................... 74/243 R

[56] References Cited

FOREIGN PATENTS OR APPLICATIONS 852,336   12/1959   Great Britain ................... 74/243 R Primary Examiner—Leonard H. Gerin
Attorney—Bruce D. Jimerson

[57] ABSTRACT

A sprocket having a raised head on each side of every tooth can be used to reduce noise, wear and vibration in chain driven power transmission systems.

6 Claims, 11 Drawing Figures

INVENTOR.
MOSCOW K. RICHMOND
BY
Bruce D. Jimerson
ATTORNEY.

SPROCKET

BACKGROUND OF THE INVENTION

Most chain drive mechanisms utilize some type of sprocket wheel for converting the linear motion of the chain to a rotary motion and vice versa. The sprocket wheel is typically of uniform thickness with teeth about its circumference shaped so that they may fit into the links of the chain which the sprocket drives, or by which it is rotated. In an application where the driving and driven members are positioned some distance apart, slight misalignment may result in serious problems if conventional sprockets are utilized. In the case of a garage door opener like the type disclosed in my patent entitled "Door Operator," Ser. No. 347,971, for example, the driving and idler sprockets are separated by approximately 12 feet. If the plane of rotation of the driven sprocket and driving sprockets are slightly different, the chain will be forced to rub against the side of the sprocket teeth. Two deleterious effects result. The first is caused by the inside links of the chain catching the valleys between the sprocket teeth as the links are taken up by the revolving sprocket. This problem produces an abrupt snap on the chain with consequent noise, wear and vibration. The second effect results from the tip of the sprocket tooth rubbing against inside links as the links leave the rotating sprocket. The periodic reoccurance of this contact with each disengaging tooth induces oscillation, particularly in long chains. These oscillations greatly increase chain wear and noise.

One solution to the first problem is to cut away a portion of the sprocket teeth so that the teeth will not contact the shoulder of the inside link. The tops of the teeth could also be tapered to avoid the whipping oscillations produced by the second phenomenom. Both of these operations, however, require expensive machining operations. What is actually desired is a sprocket which can be formed using conventional and inexpensive process (e.g. stamping) and which will obviate or materially reduce the amount of vibration, oscillation, wear and noise which result from a slight misalignment between the sprockets of a long chain transmission system.

SUMMARY OF THE INVENTION

A primary object of the invention, namely that of providing a sprocket which will reduce misalignment vibration, oscillation, noise and wear, can be effected by oval-shaped protrusions on each side of the sprocket teeth. Such a sprocket can be easily formed in a single stamping operation (or made from powdered metal by a sintering process) so that, in accordance with another object of the invention, costly machining operations are not required.

Other objects and advantages of the present invention will be obvious from the detailed description of a preferred embodiment given hereinbelow.

DESCRIPTION OF A PREFERRED EMBODIMENT

Figure 1B:
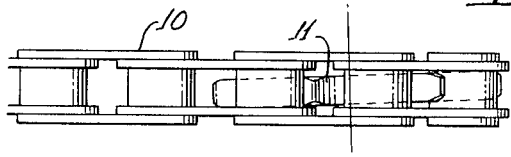
FIGS. 1a, 1b and 1c show the side, top, and end view of a conventional sprocket which is slightly misaligned with respect to the plane of the chain.
Figure 1A:
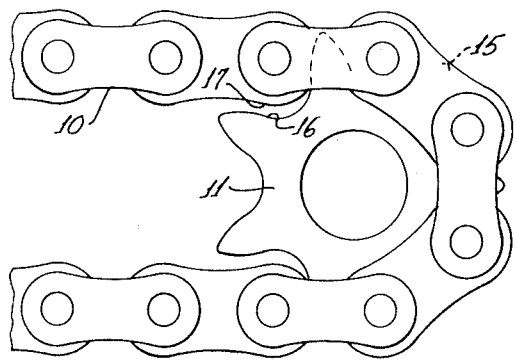

Adverting to the drawings, FIGS. 1a; 1b and 1c illustrate a link chain 10 which is slightly misaligned with respect to the plane of rotation of the convention sprocket 11. This misalignment may be caused by various factors such as stress, wear, and manufacturing tolerances. As the sprocket 11 rotates the tips of the sprocket teeth (for example tip 15) exert a frictional force on the inside links as the links leave the sprocket, whereas the valleys between adjacent sprocket teeth (for example valley 16) tend to catch the shoulder of the inside links as the links are taken up by the sprocket teeth.

Figure 2A:
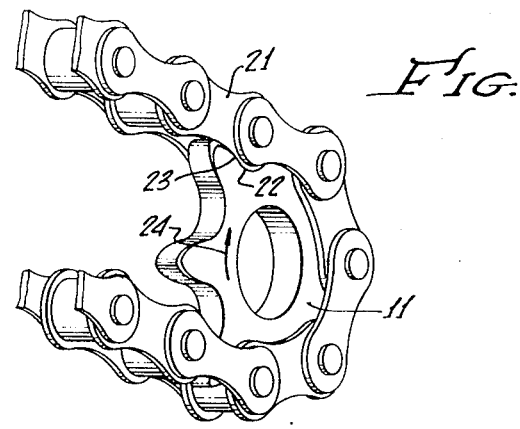
FIG. 2a is a perspective view illustrating the exact point where the shoulder of the inside link catches on the sprocket.
Figure 2B:
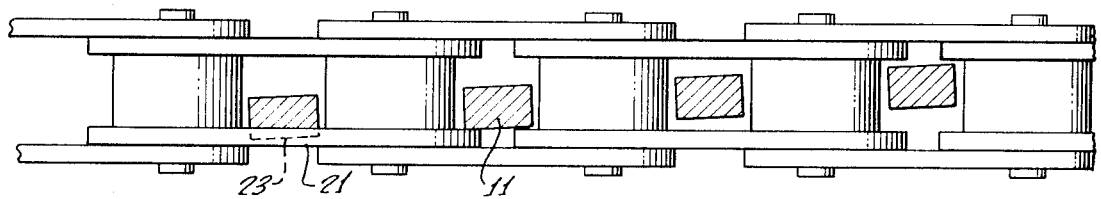
FIG. 2b shows a linear extrapolation of the same link catching the sprocket.

FIGS. 2a and 2b show in detail the actual point 23 where the inside link 21 catches the sprocket valley 22. As the sprocket continues to rotate in the direction of the arrow 23 the link 21 is lifted and then abruptly dropped. During the lifting, the radius of rotation of the chain about the circumference of the sprocket is greater, causing a tightening of the chain which increases the force between the chain and the sprocket at the time when the link slips free. The consequent noise and wear resulting from this "crunching" effect is obviously undesirable.

Figure 1C:
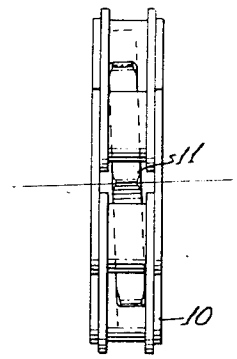
Figure 3:
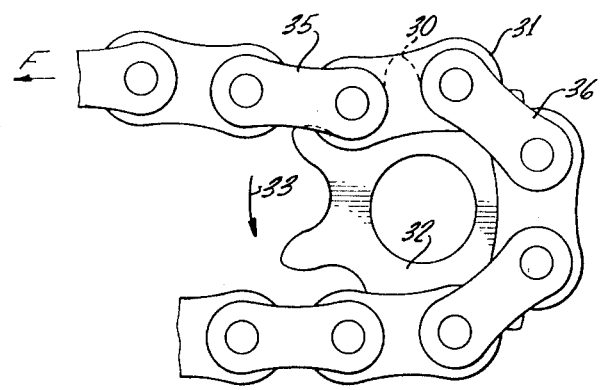
FIG. 3 shows how the inside links are flicked by the tip of the sprocket teeth as they leave the sprocket.

FIG. 3 shows in detail the point where the tip of the tooth 30 contacts the inside link under the misalignment conditions illustrated in FIGS. 1a-1c. As the link 31 leaves the sprocket 32, the tip 30 of the tooth exerts a frictional force on the link 31 in the direction of the arrow 33 causing a downward movement of the link. When the link clears the tooth, the link springs upwardly as a result of the tension force F exerted by the adjacent links 35 and 36 of the chain. As a consequence, an oscillation is imparted to each inside link by the "flick" of alternate sprocket teeth. In systems where the length of the chain is large compared to the diameter of the sprockets, the magnitude of the oscillations may become large. Where the "flicks" occur at a frequency near resonance, the vibrations may damage or eventually break the chain.

Figure 4A:
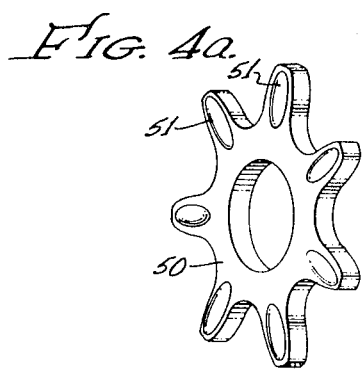
FIGS. 4a and 4b show a side and perspective view of a preferred embodiment of the invention.
Figure 4B:
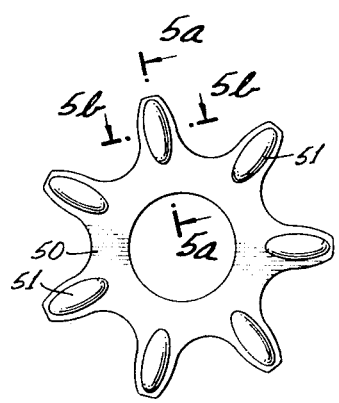

FIGS. 4a and 4b show a preferred embodiment of the invention comprising a sprocket 50 having an oval-bead shaped protrusion 51 on each side of every tooth. These raised beads 51 function in a dual capacity: (1) as a means for spacing the chain away from the sprocket, and (2) as a means for shifting the point where the tooth contacts the inside link.

Figure 5A:
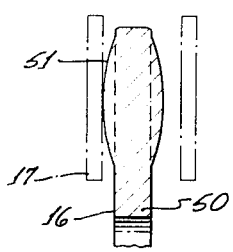
FIGS. 5a and 5b show a side and top view of the sprocket teeth illustrating how the raised bead holds the chain away from the sprocket so as to prevent the inside links from catching on the valley between the sprocket teeth.
Figure 5B:
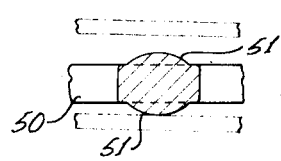
Figure 6:
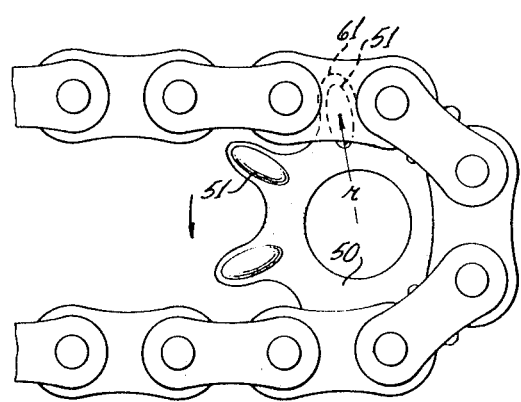
FIG. 6 shows how the raised beads lower the point of contact between the sprocket and inside link.

FIGS. 5a and 5b illustrate how the raised beads 51 keep the shoulder 17 of the inside links from catching on the valley between adjacent teeth as the links are "taken-up" by the rotating sprocket 50. FIG. 6 illustrates how the raised beads effectively lower the radius of contact between the tooth and the chain. The inside link disengages the raised bead gradually by sliding over the surface of the bead, as opposed to being abruptly released by springing free from the tip of a tooth. The combined effect of the gradually curved surface together with the lowered angular velocity at separation is to greatly decrease chain oscillations.

The size and shape of the raised bead for optimum results will depend upon the expected misalignment. In a typical application involving a 12 foot chain driven garage door opener, a bead thickness of approximately one thirty-second of an inch produced excellent results with a 1.25 inch diameter sprocket. The major axis of the oval was made approximately equal to the height of a tooth (i.e. the radial distance between a valley and tip) whereas the minor axis of the oval was approximately one-third this value.

The basic concept of the invention is, of course, not limited to a raised bead or for that matter a raised portion of any configuration. The same result may be achieved by cutting away portions of a standard sprocket, making a thicker sprocket with cut away portions, etc. An important advantage of the present invention over such an approach, however, is that the sprocket may be formed with the raised beads in a single operation (for example by stamping a powdered metal sintering). No subsequent machining or cutting is required. Any variation of this, such as forming a thick sprocket with certain areas relieved to effectuate the same result, will be recognized as merely an alternative embodiment of the present invention. The difference between saying that one portion is raised and another cut away is merely a matter of semantics for indicating a relative difference in height if the object be formed in a single operation. Thus, although a preferred embodiment of the present invention has been shown and illustrated, it will be understood that the invention is not limited thereto, and that numerous changes, modifications and substitutions may be made without departing from the spirit of the invention.

I claim:

1. A chain sprocket including:
   means for maintaining a separation between the inside links of the chain and the valleys between adjacent teeth of the sprocket as the links are "taken-up" to rotate about the circumference of the sprocket whereby the inside links are prevented from catching on the valleys even though there is some misalignment between the sprocket and chain; and
   means for preventing the tip of the sprocket teeth from flicking the inside links of the chain as they leave the sprocket.

2. The chain sprocket recited in claim 1 wherein said means for maintaining a separation between sprocket and chain comprises:
   a raised bead on each side of the sprocket teeth.

3. The chain sprocket recited in claim 1 wherein said means for preventing the tip of the sprocket teeth from flicking the inside links comprises:
   a raised bead on each side of the sprocket teeth.

4. A sprocket of the type commonly used in chain drive power transmission systems, wherein the improvement comprises:
   a protrusion on each side of the sprocket teeth whereby a space will be maintained between the inside links and the valleys between the sprocket teeth so as to prevent the shoulders of the inside links from catching the valleys as the chain is taken up by the sprocket.

5. The sprocket recited in claim 4 wherein said protrusion comprises:
   an oval shaped bead.

6. The sprocket recited in claim 5 wherein said oval shaped bead has its maximum rise at a radial dimension less than the radial distance to the tip of a tooth whereby the force exerted by a misaligned chain is distributed over the surface of the bead at a radial distance less than the radial distance to the tip of a tooth.

* * * * *